United States Patent [19]

Kingsley

[11] Patent Number: 4,817,976

[45] Date of Patent: Apr. 4, 1989

[54] VEHICULAR RAIN SKIRTS

[75] Inventor: Richard J. Kingsley, Skamania, Wash.

[73] Assignee: Saturn Corporation, Tacoma, Wash.

[21] Appl. No.: 104,255

[22] Filed: Oct. 5, 1987

[51] Int. Cl.⁴ .............................................. B62D 25/16
[52] U.S. Cl. ..................................... 280/154; 280/848; 280/849; 280/851
[58] Field of Search .................... 280/152 R, 152.3 R, 280/153 B, 153 R, 154, 154.5 R, 153 A

[56] References Cited

U.S. PATENT DOCUMENTS

| | | | |
|---|---|---|---|
| 1,472,005 | 5/1921 | Jones | 280/153 R |
| 2,972,149 | 2/1961 | Bracesco | 280/154.5 R |
| 3,866,943 | 2/1975 | Innis | 280/154.5 R |
| 3,922,003 | 11/1975 | Lea | 280/154.5 R |
| 4,174,653 | 11/1979 | Appelblatt | 280/154.5 R |
| 4,192,522 | 3/1980 | Morgan | 280/154.5 R |
| 4,325,563 | 4/1982 | Brandon et al. | 280/154.5 R |
| 4,406,474 | 9/1983 | Scharf | 280/154.5 R X |
| 4,421,333 | 12/1983 | Van Dyke | 280/154.5 R |
| 4,436,319 | 3/1984 | Clutter | 280/154.5 R |
| 4,445,700 | 5/1984 | Schroeder | 280/154.5 R |

FOREIGN PATENT DOCUMENTS

| | | | |
|---|---|---|---|
| 0436710 | 6/1948 | Italy | 280/153 R |
| 0424077 | 2/1935 | United Kingdom | 280/153 R |

Primary Examiner—David M. Mitchell
Assistant Examiner—Brian L. Johnson

Attorney, Agent, or Firm—Hughes, Cassidy & Multer

[57] ABSTRACT

A modular rain skirt assembly (20', 20, 20") for use in reducing the laterally projected component of finely atomized, dense, mist emanating from the running gear of heavy vehicles traveling on rain coated road surfaces and including: one or more generally flat, elongate panels (28, 28', 28"), each having inturned leading and trailing edges (30, 31) and each defining a projected mist capture area adapted to extend downwardly about the outer upper surfaces of the tires mounted on the vehicle's running gear; at least one spacer panel (29, 29') interposed between each adjacent pair of elongate panels (28, 28', 28") in those rain skirt assemblies (20, 20") employing two or more elongate panels (28, 28', 28") for use with tandem axle configurations and wherein the spacer panel (29, 29') includes inturned leading and trailing edges (32, 34) complementally shaped with respect to the trailing and leading edges (31, 30), respectively, of the adjacent elongate panels (28, 28', 28") with the leading edge (32) of each spacer panel (29, 29') being fixed secured to the trailing edge (31) of the adjacent elongate panel (28, 28') and the trailing edge (34) of each spacer panel (29, 29') being affixed to the leading edge (30) of the adjacent elongate panel (28', 28") so as to form a unitary rain skirt assembly (20', 20, 20"). Fore and aft mounting brackets (44, 45) are provided for mounting each unitary rain skirt assembly (20', 20, 20") to a side frame member (21) on the vehicle.

30 Claims, 6 Drawing Sheets

VEHICULAR RAIN SKIRTS

BACKGROUND OF THE INVENTION

1. Technical Field

The present invention relates generally to vehicular rain skirts; and, more particularly, to simple, rugged, economical and highly effective modular rain skirt assemblies which can be quickly and easily installed on a wide range of vehicles but, especially, outboard of the rear wheels of large tractor trailers of virtually any conventional type including, but not limited to, reefers, tankers, enclosed box trailers, low-boys, etc., all irrespective of whether applied to trucks and/or tractor-trailers employing one or more single axles and/or one or more tandem axles, and irrespective of whether any given axle employs one wheel or coaxial dual wheels.

More specifically, vehicular rain skirt assemblies embodying features of the present invention are characterized by their significant reduction of traffic hazards resulting from highly atomized, fine, dense mists that are protected laterally from the wheels of trucks traveling on wet highways, both from the standpoint of the vehicle on which the rain skirt assemblies are employed and from the standpoint of other vehicles which are either passing the truck or are being passed by the truck. Additionally, rain skirt assemblies embodying features of the invention significantly enhance the aesthetic appearance of the vehicles to which they are attached, while simultaneously permitting of incorporation of reflectors and/or running lights to further enhance safety characteristics, as well as permitting placement of corporate logos and the like that serve to identify the vehicle owner and/or user, all without interfering in any way with complete freedom of unobstructed access to the vehicle's running gear for purposes of changing tires, installing and/or removing chains, and/or other routine maintenance procedures.

2. Background Art

For many years there has been an ever increasing problem resulting from the use of heavy trucks and tractor-trailer rigs on heavily trafficked roads during and/or immediately following rainstorms and other inclement weather conditions—e.g., melting snow, etc. Thus, when such heavy vehicles are driven over wet road surfaces, particularly at relatively high speeds, rain accumulated on the road surface is picked up by the vehicle's running gear and centrifugally projected therefrom in droplet form at relatively high speeds, impacting the vehicle undercarriage and other vehicle structure and generating a large quantity of extremely fine, atomized, dense mist particles which are projected laterally from those areas of the vehicle which are located adjacent the upper surfaces of the tires and the vehicle's undercarriage.

From the standpoint of the truck driver, the finely atomized mist generated by the rear wheels of the truck and/or any trailer appended thereto and which is protected laterally creates a significant traffic hazard since, under these conditions, the driver is often unable to see through the vehicle's rearview mirrors either the rear end of his/her own vehicle or other vehicles which are passing or being passed. Moreover, such mists often make it difficult, if not impossible, for the truck driver to see signal lights on trailing vehicles which are commonly used to alert the driver as to when it is and/or is not safe to move from one lane of moving traffic to another. Of course, those skilled in the art will readily appreciate that a similar misting problem is also generated at the front wheels of such vehicles: but, this is commonly of less concern to the truck driver who generally sits sufficiently high above the road that mists projected laterally from the front wheels create no particular problem for the truck driver.

On the other hand, drivers of small vehicles such as automobiles, pickup trucks, and the like, are subjected to unnecessary risks and dangers by the laterally projecting mists whenever they are in a passing situation—be it a situation where they are being passed by the truck or where they are driving the passing vehicle——and, this is true irrespective of whether the mist is projected laterally by the truck's and/or trailer's rear wheels or by the front wheels. Indeed, virtually all drivers of small automotive vehicles have, in the past, actually experienced real danger when either passing trucks or being passed by trucks on rain soaked highways, particularly at high speeds—a danger that is directly attributable to the laterally protected, finely atomized, dense mist generated by the truck's wheels which serves to virtually blind the small vehicle driver during the entire period of time when the automobile is adjacent the heavy truck and either even with, or aft of, the front wheels of the truck. And, of course, when the two vehicles are both being operated at speeds which are not significantly different, the passing condition can exist for up to several seconds, during which time the small vehicle driver may be unable to see what is in front or what is in back of his or her vehicle; and, since the small vehicle driver is unable to see clearly either to the front or to the rear, he/she is often reluctant to either increase speed or decrease speed, thereby exacerbating the blindness problem.

As a consequence of the foregoing severe safety hazard, many states have, during the last decade or so, enacted laws requiring trucks and other heavy duty vehicles above a certain tonnage to shield their wheels so as to minimize lateral projection of finely divided dense sprays and/or mists; and, other states are presently contemplating such legislation. This has, in turn, lead to extensive research and development work in an effort to devise effective shielding arrangements which can be employed to comply with such regulations. Unfortunately, however, prior to the advent of the present invention, such efforts have not proven successful; and, as a consequence, some states have delayed implementation of their laws while others are simply making no effort to enforce them, all pending the availability of an effective shielding arrangement that can be readily applied to trucks of different types and which conform to other vehicular regulations.

For example, one type of proposed system which has been used involves the mounting of brushes, bristles, and the like, on the vehicle in a position to positively wipe the surface of the vehicle's rapidly rotating tires so as to remove the water clinging thereto before it is converted from discrete liquid droplets to a finely atomized mist. While the foregoing system has met with some degree of success in terms of mist elimination, it has not been found to be either commercially acceptable or practical for a number of reasons. Thus, such an arrangement serves to generate considerable heat and results in undesirable wear of the tires. Moreover, the brushes and bristles are quickly worn out and need to be replaced. Therefore, such systems are prohibitively expensive. Indeed, such an arrangement does not readily lend itself to installation when inclement conditions are encountered and removal when good weather conditions are encountered; and, consequently, the heat generation and wear problems continue even under the best of weather conditions when the mist eliminators are performing no useful function.

Recognizing the need for an effective means for eliminating this serious traffic hazard problem, extensive research and development efforts have been conducted during the past decade in an effort to devise acceptable apparatus for heavy trucks and the like which will enable the trucking industry to comply with the ever more stringent regulations that have been, and are continuing to be, enacted. Exemplary of such research and development efforts are the various systems disclosed in recently issued U.S. Pat. Nos. 4,192,522—Morgan (1980), 4,325,563—Brandon et al (1982), 4,436,319—Clutter (1984), and 4,445,700—Schroeder (1984).

Thus, the aforesaid Morgan patent discloses a highway vehicle splash and spray control shield comprising a bulky, complex, box-like baffle arrangement adapted to be mounted on the tandem axles of truck-trailer combinations and defining a system which attempts to control spray by aerodynamically controlling the flow of air in the region of the vehicle's running gear.

Similarly, Brandon et al have attempted to control the problem by designing a complex baffle arrangement defining a plurality of curved air passages by which it is intended to separate water droplets from the moving air.

In the aforesaid Clutter and Schroeder patents, the patentees provide relatively cumbersome, box-like, baffle structures which are designed to substantially enclose the forward, upper and rearward inner and outer surfaces of the vehicle wheels irrespective of whether single or tandem axles are employed and irrespective of whether each axle carries a single tire or adjacent coaxial dual tires. Clutter is of further interest for his disclosure of other patentees' unsuccessful efforts to resolve the spray problem.

Other patents of purely incidental interest are: U.S. Pat. No. 2,972,149—Bracesco relating to a mud guard; and, U.S. Pat. No. 4,406 474—Scharf relating to a vehicle fender attachment.

Each of the foregoing patented approaches incorporate a number of inherent disadvantages which, for the most part, have rendered the patented products impractical. Thus, the traffic safety hazard resulting from the driving of heavy trucks on wet highways, particularly at high speeds, is, as previously stated, directly attributable to the fact that water is picked up by the rotating tires, centrifugally projected against the vehicle undercarriage and running gear so as to convert the water droplets into finely atomized and extremely dense mist which is projected laterally away from the truck. Consequently, solution to the problem lies in reduction, and elimination if possible, of the laterally directed component of such mists which: (i) interfere with and obstruct the truck driver's vision through rearview mirrors when such mists are projected laterally from the rear wheels of the truck; and (ii), interfere with, obstruct and, in severe conditions, blind other motorists who are either passing the truck or are being passed by the truck—a severe problem encountered at all axle locations on the truck. Thus, solution to the problem does not lie in enclosing the wheels in box-like baffle structures which tend to retain heat, which are difficult to install and remove, and which themselves tend to produce finely atomized mists when impacted by centrifugally projected water droplets moving at high speeds. Nor is it believed that the solution lies in trying to wipe the moisture off the rapidly rotating wheels with brushes nor in attempting to provide baffles to control and direct airflow. Indeed, such complex baffle arrangements are not only difficult to install, prohibitively expensive, and actual sources of finely atomized mist, but, moreover, they make work on the vehicle's running gear extremely difficult when the driver is required to change tires, install and/or remove chains, or to engage in other routine maintenance of the running gear.

SUMMARY OF THE INVENTION

The present invention overcomes all of the foregoing disadvantages by providing simple, relatively inexpensive, yet rugged, modular rain skirt assemblies which are highly effective in virtually eliminating the problem of laterally projected, finely atomized, dense mists emanating from the running gear of trucks, tractors, tractor/trailer combinations, and the like, which are traveling over rain soaked road surfaces, often at high speeds. Thus, the modular rain skirt assemblies of the present invention permit of incorporation of the rain skirt on virtually all types of heavy vehicles irrespective of whether they employ single axles or tandem axles, and irrespective of whether the running gear includes one wheel per axle or coaxial dual wheels per axle. That is, in each different installation essentially the same basic components are employed, thus reducing manufacturing, shipping and storage costs, as well as reducing replacement costs should a given module be damaged in an accident or otherwise. Moreover, the improved modular rain skirt assemblies of the present invention are further characterized by their ease of installation; as well as by the fact that, when installed, they do not interfere with or otherwise obstruct complete freedom of access to the vehicle's running gear should the truck driver be required to change tires, apply and/or remove chains, or otherwise engage in routine maintenance.

Modular rain skirt assemblies embodying features of the invention are further highly advantageous in that they present a streamlined, highly appealing, aesthetic appearance when applied to heavy duty vehicles, as well as providing a suitable location for: (i) reflectors, running lights ad/or light tracks which enhance vehicle safety; and/or (ii), corporate logos and similar promotional and/or identifying materials.

It is a principle objective of the invention to provide vehicular rain skirt assemblies of generally flat modular construction which permit of ease of manufacture, shipment and installation, yet wherein the same modular elements can be employed with equal utility to deflect laterally projected mists emanating from the wheels located on either the passenger side of the vehicle or the driver side of the vehicle and irrespective of whether: (i) such wheels are mounted on front, intermediate, or rear axles; (ii) single or tandem axles are employed; and (iii), any given axle includes but a single wheel or coaxial dual wheels. Moreover, the invention readily permits the modular rain skirt assemblies to be pivoted upwardly into an inoperative position when not in use, thus enabling complete freedom of unobstructed access to the running gear of the vehicle for purposes of changing tires, installing and removing chains, and other routine maintenance, all without having to dismantle and/or remove the rain skirt assembly. An ancillary object of the invention is the provision of modular rain skirt assemblies having the foregoing characteristics, yet which, when applied to the vehicle side, do not project laterally from the vehicle to any significant extent—e.g., the exemplary modular rain skirt assemblies, when in use, project laterally from the vehicle body by only about 2¼″—and, therefore, which do not run afoul of other vehicle regulations governing the use of side mounted accessory items.

DESCRIPTION OF THE DRAWINGS

These and other objects and advantages of the present invention will become more readily apparent upon reading the following Detailed Description and upon reference to the attached drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as expressed in the appended claims.

DETAILED DESCRIPTION

Turning now to the drawings, and as best illustrated by reference to FIGS. 1 and 2 conjointly, an exemplary rain skirt assembly embodying features of the present invention and generally indicated at 20, has been shown as installed on the side frame 21 of a conventional heavy truck or similar vehicle, here shown as located adjacent, and projecting below, the rear cargo area, generally indicated at 22, of an otherwise conventional truck or tractor-trailer. In this exemplary form of the invention, the rain skirt assembly 20, which is of modular construction as hereinafter described in greater detail, is designed for use with, and is shown in association with, the running gear, generally indicated at 24, located at the rear of such a truck or trailer and which here takes the form of a dual tandem axle arrangement employing a leading pair of coaxial wheels 25a, 25b on a leading rear axle (not shown) and a trailing pair of coaxial wheels 26a, 26b on a close coupled trailing rear axle (not shown). Of course, as the ensuing description proceeds, those skilled in the art will appreciate that, in its broader aspects, the invention is not limited to use with dual tandem axle constructions or to use with axles having dual wheels or, for that matter, to only the rear axle/wheel combinations of heavy vehicles; but, rather, the invention, because of its modular design, finds particularly advantageous application with virtually any and all types of running gear for heavy vehicles, including both the front and rear axle/wheel combinations of a conventional cab and all axle/wheel combinations used with trucks and/or tractor-trailer rigs.

Figure 1:
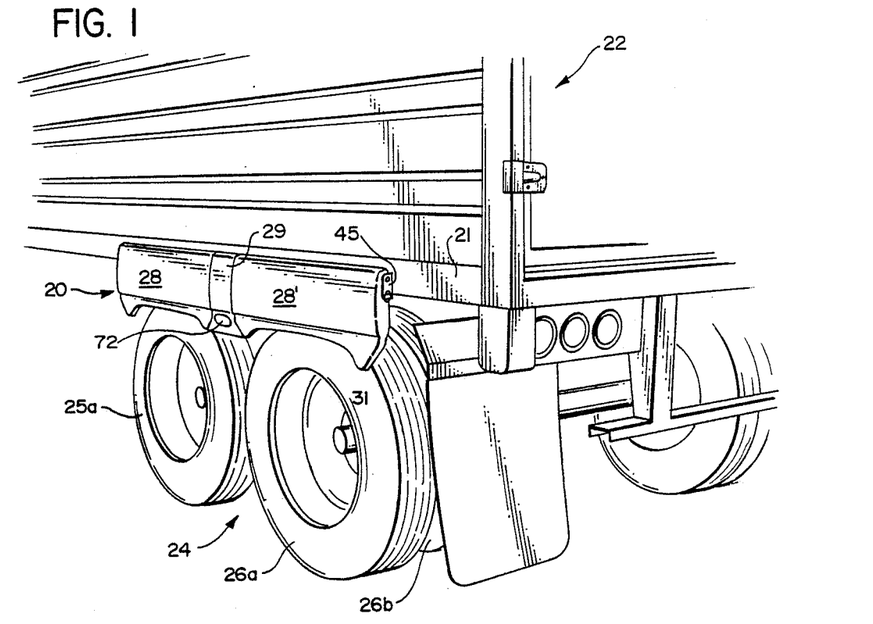
FIG. 1 is a fragmentary isometric view of the rear tandem axle area of a conventional truck or trailer in a tractor/trailer combination, here illustrating a modular rain skirt assembly embodying features of the invention as mounted on the side of the vehicle body in operative shielding relation to the vehicle's rear running gear which here takes the form of a conventional dual tandem axle assembly.
Figure 2:
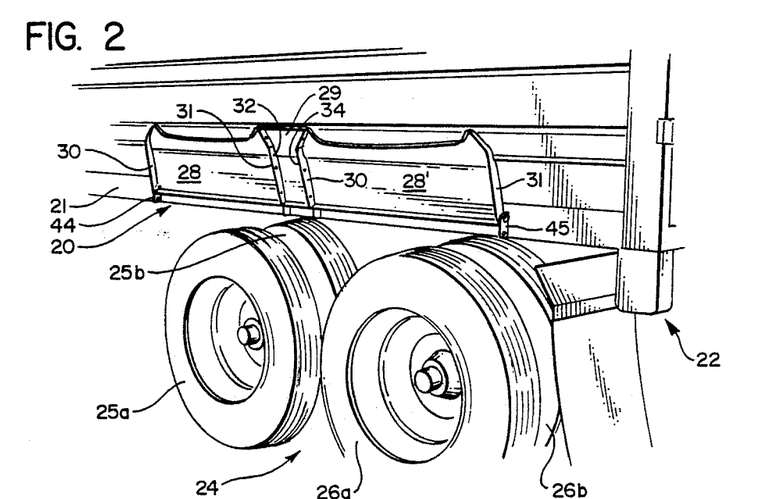
FIG. 2 is a fragmentary isometric view somewhat similar to FIG. 1, but here illustrating the exemplary modular rain skirt assembly shown in FIG. 1 as employed on a vehicle employing at least one tandem axle pivoted upwardly into in an inoperative position for permitting unimpeded access to the running gear for purposes of changing tires, installing and/or removing chains, and other routine maintenance.

In carrying out the exemplary form of the present invention, the rain skirt assembly 20 is of modular design; and, when assembled for use with a dual tandem axle vehicle of the type shown in FIGS. 1 and 2, consists of two (2) completely identical, elongate, generally flat or planar, contoured skirt panels 28, 28' which are interconnected to, and spaced from, one another by an intermediate spacer panel 29. As more clearly depicted in FIG. 4 wherein the exemplary rain skirt assembly 20 is shown from the rear—viz., from the surface which is presented in facing relation to the vehicle wheels when the rain skirt is in its operable position—each of the panels 28, 28' are provided with a peripherally continuous internal flange defining an inturned leading edge 30 and an inturned trailing edge 31. Similarly, the spacer panel 29 is also provided with a peripherally continuous internal flange defining an inturned leading edge 32 and an inturned trailing edge 34.

Thus, the arrangement is such that the trailing edge 31 of panel 28 is shaped complementally to the leading edge 32 of spacer panel 29, thereby permitting the panel 28 and the spacer panel 29 to be placed in side-by-side, edge-to-edge, abutting relationship and fastened together to form a unitary structure by means of a plurality of threaded fasteners such, merely by way of example, as a plurality of bolts 35 passing through the abutting edges 31, 32 and secured in place by nuts 36. In like manner, the trailing edge 34 of the spacer panel 29 and the leading edge 30 of the panel 28' are also complementally shaped so as to permit juxtaposition thereof in edge-to-edge abutting relationship, with the two panels again being secured together by a plurality of nut-and-bolt combinations 35, 36 passing through their abutting edges 30, 34 so as to form a unitary three-piece rain skirt assembly 20 consisting of two (2) differently shaped basic modules—viz., the identical modules 28, 28' and module 29.

Figure 3A:
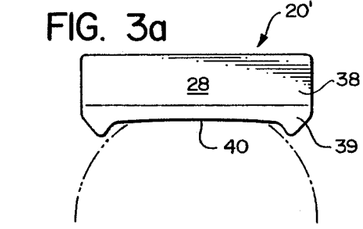
FIG. 3a is a highly diagrammatic side elevational view, here depicting a modular rain skirt assembly embodying the present invention as mounted in operative condition with respect to the wheel(s), here shown in phantom lines, on a conventional single axle installation.

Referring to FIG. 3a, it will be observed that when the rain skirt assembly, here designated generally at 20', is employed with a single axle configuration—e.g., the front cab wheels and, in many cases, the rear cab wheels and/or one or more sets of the truck or tractor-trailer wheels—the assembly requires only a single rain skirt panel 28. On the other hand, when used with dual tandem axle assemblies such as generally indicated at 20 in FIG. 3b and as previously described in connection with FIGS. 1, 2, and 4, the rain skirt assembly 20 employs two (2) identical panels 28, 28' spaced apart by a single spacer panel 29. Finally, when used with a triple tandem axle arrangement, the rain skirt assembly, designated generally at 20" in FIG. 3c, employs three (3) identical elongate panels 28, 28', 28" and two (2) identical intervening spacer panels 29, 29', all of which are assembled in precisely the manner described above in connection with FIG. 4.

Figure 3B:
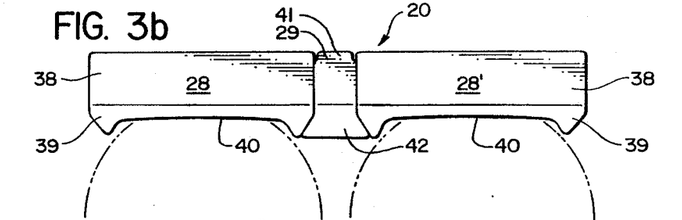
FIG. 3b is a highly diagrammatic side elevational view similar to that shown in FIG. 3a, but here depicting a modular rain skirt assembly embodying features of the invention mounted in operative relation with the wheels (shown in phantom) of a conventional tandem axle vehicle employing two closely coupled axles.
Figures 3C, 4:
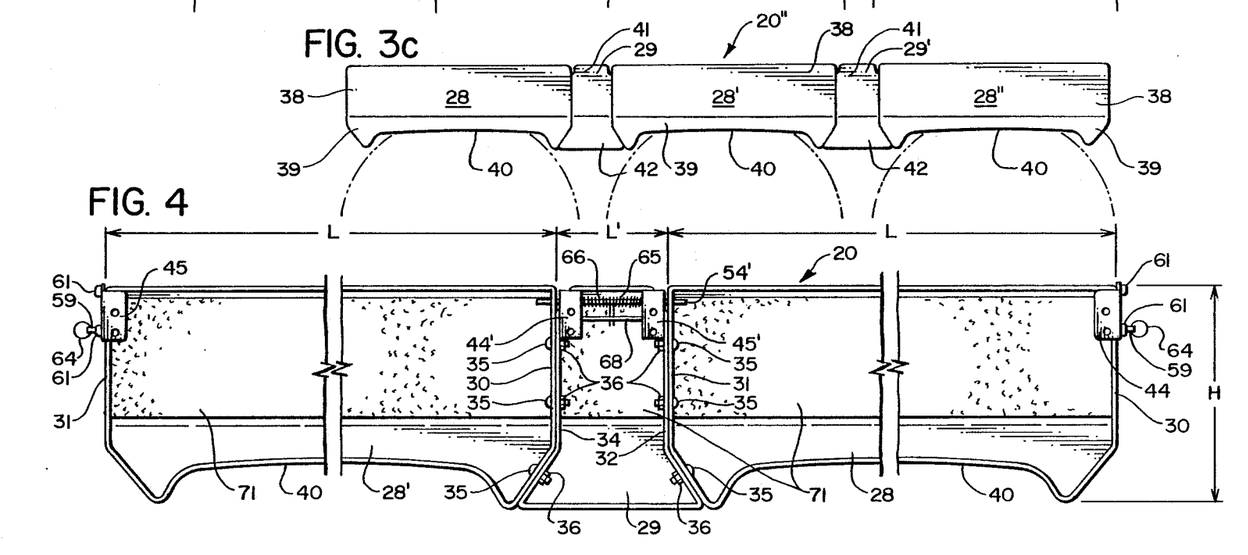
FIG. 3c is a highly diagrammatic side elevational view similar to FIGS. 3a and 3b, but here illustrating a modular rain skirt assembly embodying the features of the invention as employed in connection with a tandem axle arrangement incorporating wheels (shown in phantom) mounted on three closely coupled axles.
FIG. 4 is an fragmentary inside elevational view of an assembled modular rain skirt assembly suitable for use with a dual tandem axle installation, here depicting details of the mounting fixtures and inside surfaces of the assembly.

Although not critical to the present invention, those skilled in the art will have a better understanding of the invention upon appreciation that the exemplary modular rain skirt assembly depicted in, for example, FIGS. 1, 2, 3b and 4 consists of two (2) differently, but complementally, shaped molded or vacuum formed panel pieces—i.e., a pair of identical panels 28, 28' and the intermediate spacer panel 29—which are preferably formed of any suitable plastic or thermoplastic material such, merely by way of example as an acrylonitrile-butadiene-styrene copolymer ("ABS") which is capable of being molded and/or vacuum formed into the streamlined, contoured configurations depicted in the drawings. Preferably, the panels are vacuum formed of ABS sheet material of approximately 3/16" thickness. In the exemplary construction, and as best shown in FIG. 4, the panels 28, 28' each have an overall length L of approximately 40¾", a height H of approximately 15", and a maximum depth D (FIG. 6) defined by the inturned leading and trailing edges 30, 31 of approximately 1¼". Similarly, the exemplary spacer panel 29 has an overall length L' (i.e., the length excluding the outwardly flaring lower extremities) of approximately 7¼", while the height and maximum depth are the same as those of the panels 28, 28'.

Moreover, while not critical to the invention, the overall aesthetic appearance of the rain skirt assembly is enhanced by providing a somewhat streamlined, contoured configuration for the panels when viewed in cross-section or on end (See, e.g., FIGS. 6 and 9), as well as when viewed in side elevation (See, e.g., FIGS. 1, 3a, 3b, and 3c). Thus, when viewed in side elevation, it will be noted that the panels 28, 28', 28" each include a rectangular, generally flat but slightly domed (See, FIG. 6) upper section 38; and, a recessed or reduced depth (See, FIG. 6) trapezoidally shaped lower section 39 characterized by converging leading and trailing edges 30, 31 and which may be slightly cut out along the bottom edge of the panel as indicated at 40 to simulate a fender wheel well. Spacer panel 29 is complementally shaped, also including a rectangular, generally flat but slightly domed (See, FIG. 9) upper section 41 and a recessed or reduced depth (See, FIG. 9) trapezoidally shaped lower section 42 characterized by diverging leading and trailing edges 32, 34 which are shaped complementally to the edges 31, 30 respectively on the panels 28, 28'. Thus, the modular construction permits prepackaging of kits containing all of the panels required for single axle and/or dual and triple tandem axle rain skirt assemblies—assemblies which are on the order of 40¾", 89", and 137¼", respectively, in overall length—including the hardware, in boxes or cartons having an overall combined length and girth less than the 84" limit prescribed for shipping parcels via United Parcel Service (UPS), thereby minimizing, packaging, shipping and stocking costs.

In keeping with the present invention, provision is made for mounting the rain skirt assembly 20', 20, 20" (FIGS. 3a–3c) on the side frame 21 (FIGS. 1 and 2), bed or other structural member of a conventional truck or tractor-trailer with freedom for pivotal movement about a horizontally extending axis through an angle approaching 180° so as to permit deployment of the rain skirt assemblies in one of two fixed positions—viz., (i) a first vertically downwardly depending plane wherein the rain skirt assembly is in operative mist screening association with the vehicle wheels, as best shown in FIG. 1; or (ii), alternatively, in a second upwardly pivoted, generally vertically extending plane wherein the rain skirt assembly is in the inoperative position shown in FIG. 2 wherein the rain skirt assembly is in face-to-face relation with the truck body, thereby providing completely unobstructed access to the running gear so as to permit changing of tires, installation and/or removal of chains, and other routine maintenance. To accomplish this, the mounting hardware for the rain skirt assemblies preferably includes a pair of generally L-shaped, fore and aft metal mounting brackets 44, 45, one of such brackets 13 viz., the aft mounting bracket, generally indicated at 45—being depicted in greater detail in FIG. 8. Each mounting bracket 44, 45 includes a vertical planar flange 49 having a pair of vertically aligned through apertures 50 which permit of permanent, but separable, attachment to the side frame 21 or other structural edge member of the bed or undercarriage of the truck or tractor-trailer by means of completely conventional bolt/nut combinations 51 as best shown by reference to FIGS. 5, 6 and 7 conjointly. To permit pivotal attachment of the rain skirt assemblies 20', 20, 20" (FIGS. 3a–3c) to the vehicle, each mounting bracket 44, 45 includes a second vertical planar flange 52 normal to flange 49 and on which is integrally mounted a horizontally projecting pivot pin 54 positioned to pass through the uppermost one of three (3) generally vertically oriented, closely spaced, apertures 55, 56, 58 formed in the leading and trailing edges 30, 31 of each of the panels 28, 28', 28", as best shown by reference to FIGS. 5, 6, and 7 conjointly wherein the pivot pin 54 passes through the aperture 55 formed in the trailing edge 31 of panel 28'.

Figure 5:
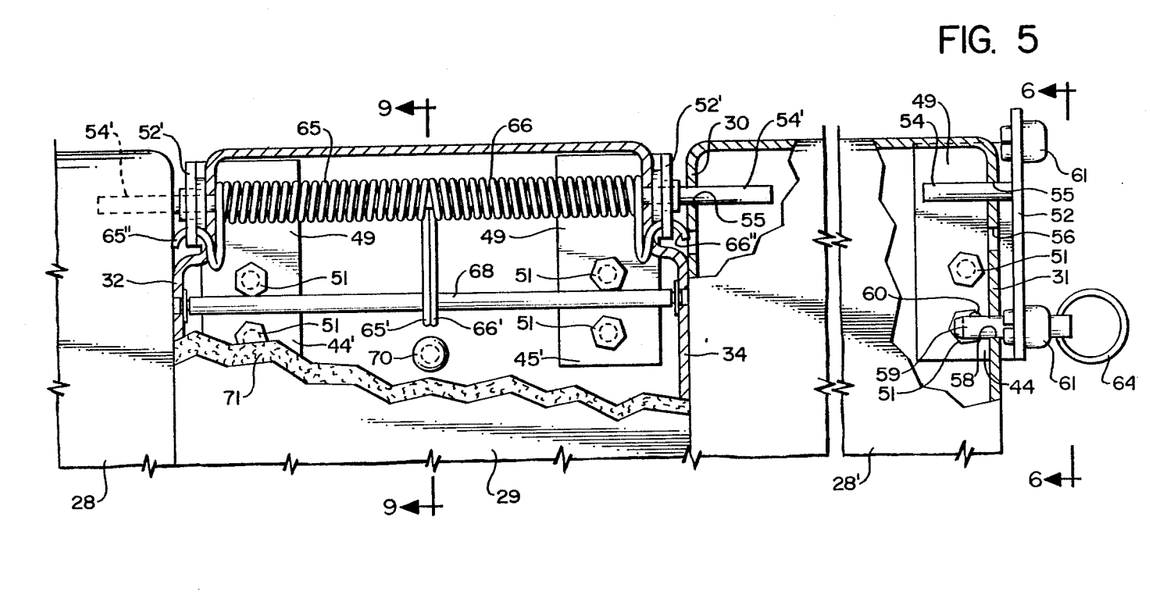
FIG. 5 is an enlarged, fragmentary, outside elevational view of the outer surfaces of the rain skirt assembly depicted in FIG. 4, here shown with portions of the outer panel and interior absorbant liner cut away so as to reveal structural details of the locking assembly and the spring-loaded pivoting mechanism employed.
Figure 8:
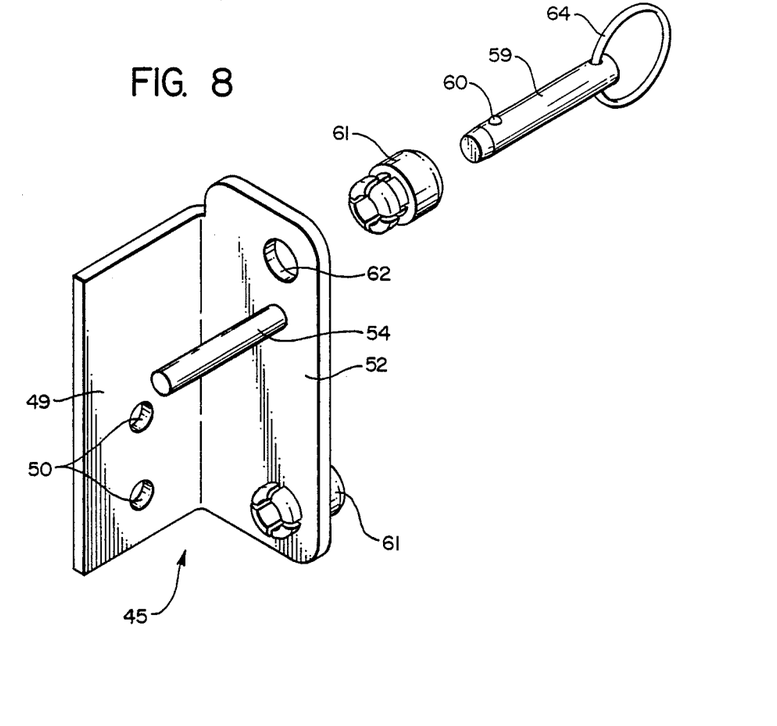
FIG. 8 is an isometric view, in partially exploded form, here depicting the various components of a typical one of the fore and aft mounting brackets and latching mechanisms employed with the present invention.
Figure 9:
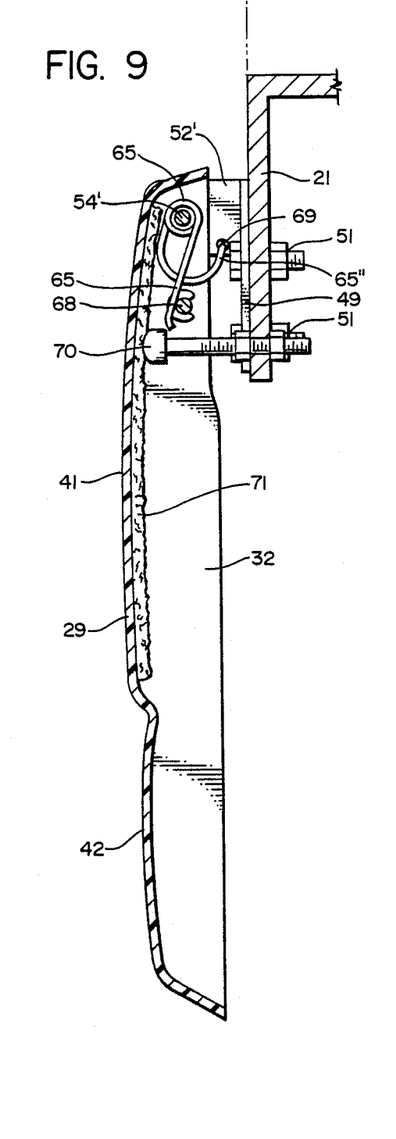
FIG. 9 is a vertical sectional view taken substantially along the line 9—9 in FIG. 5, here depicting details of an exemplary spring biasing mechanism for the rain skirt assembly which is shown in its downward, spring-biased, operative position; and, FIG. 10 is a vertical sectional view taken from the same general perspective as FIG. 9, but here illustrating the spring biasing arrangement when the exemplary modular rain skirt assembly is pivoted upwardly into the inoperative position shown in FIG. 2.
Figure 10:
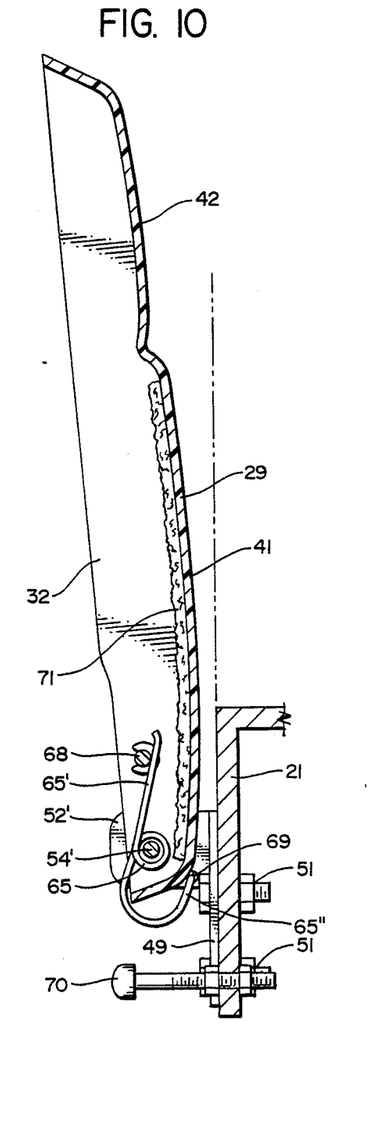

It will, of course, be understood that when mounting a single rain skirt panel 28 on a vehicle in operative association with a single axle such, for example, as in the arrangement depicted diagrammatically in FIG. 3a, only two (2) mounting brackets 44, 45 will be required, which mounting brackets will be identical except that the aft bracket 45 will include a forward protecting flange 49 and pivot pin 54 while the forward bracket 44 will include a rearwardly projecting flange 49 and pivot pin 54, thereby permitting the flanges 49, bolt/nut combinations 51 and pivot pins 54 to be concealed from view when the rain skirt assembly 28 is in the operative position depicted in FIG. 3a, while simultaneously permitting the pivot pins 54 to pass operatively through the leading and trailing edges 30, 31 of the panel 28. However, when the rain skirt assembly is to be installed with a dual tandem axle system, as best shown in FIGS. 3b, 4, and 5, two (2) additional leading and trailing edge fore and aft mounting brackets 44', 45' are provided which are essentially identical to the mounting brackets 44, 45, of which bracket 45 is shown in FIG. 8, except that the flange 52 shown in FIG. 8 upon which pivot pin 54 is mounted is cut away at its lowermost end so as to form a vertically shortened upper flange 52', as best shown in FIGS. 5, 9, and 10; and, additionally, the modified mounting brackets 44', 45' are pivotally mounted on an elongate pivot pin 54' having a length greater than the length L' depicted in FIG. 4 and projecting entirely through spacer panel 29 with the opposite ends of pin 54' projecting beyond the leading and trailing edges 32, 34 of the spacer panel 29. The projecting free ends of elongate pivot pin 54' are, again, pivotally received within the uppermost openings 55 formed in the leading edge 30 of panel 28' and in the trailing edge 31 of panel 28, all as best observed upon inspection of FIGS. 4 and 5 conjointly. And, of course, when providing a rain skirt assembly 20" (FIG. 3c) for a triple tandem axle installation, it will be understood that six (6) fore and aft mounting brackets will be employed— viz., a pair of fore and aft mounting brackets 44, 45 for the leading and trailing edges 30, 31 of the overall rain skirt assembly 20"; a first set of mounting brackets 44', 45' for use with the spacer panel 29; and, a second set of brackets 44', 45' for use with the spacer panel 29'.

Figure 6:
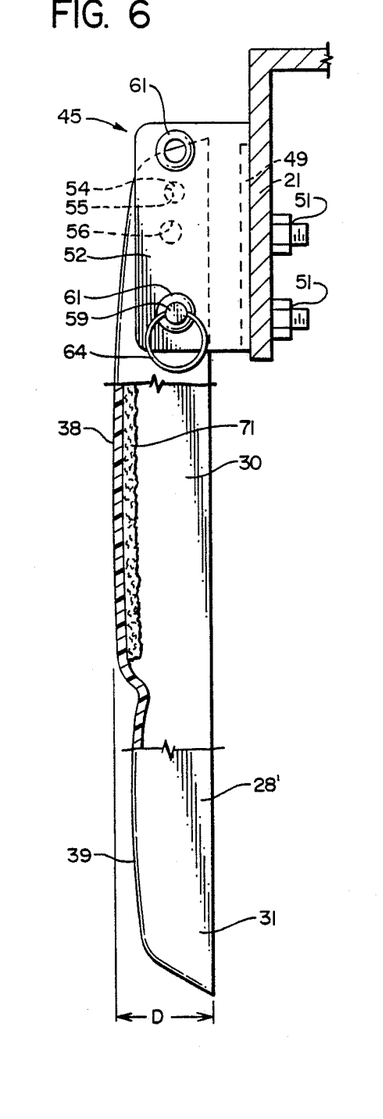
FIG. 6 is an end elevational view, partly in section, taken substantially along the line 6—6 in FIG. 5, and here depicting a modular rain skirt assembly embodying features of the invention as mounted on the side frame of a conventional heavy vehicle and as deployed in operative shielding relationship to the vehicle's running gear (not shown)
Figure 7:
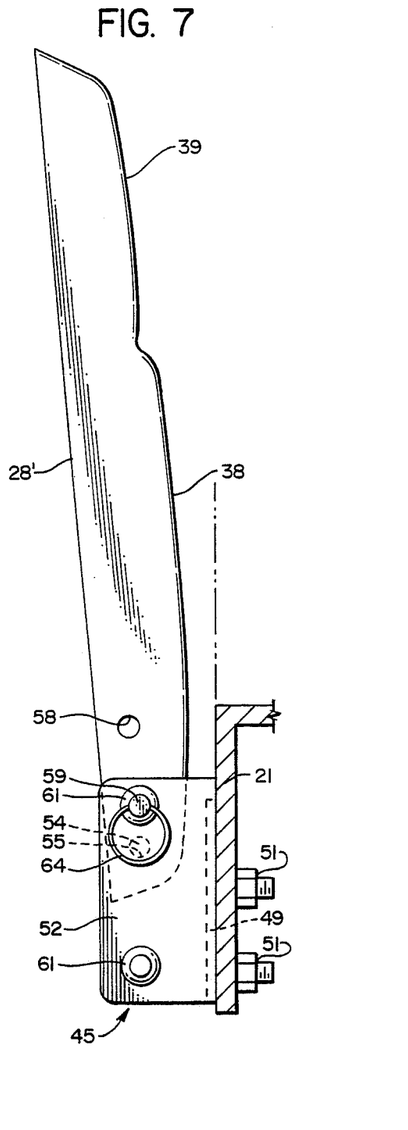
FIG. 7 is an end view, partly in section, taken from the same general perspective as FIG. 6, but here illustrating the modular rain skirt assembly of the present invention pivoted upwardly into the inoperative position shown in FIG. 2 wherein the driver has complete freedom of unobstructed access to the vehicle's running gear.

In accordance with another of the important aspects of the present invention, provision is made for latching the rain skirt assembly 20', 20, 20" in a selected one of two (2) positions—viz., the vertically depending operative position shown, for example, in FIGS. 1 and 6; or, alternatively, the pivoted, vertically upstanding, inoperative position shown in FIGS. 2 and 7. To accomplish this, the two (2) fore and aft mounting brackets 44, 45—See, e.g., mounting bracket 45 depicted in FIG. 8—which are associated with the leading and trailing edges 30, 31 of the overall rain skirt assembly 20', 20, 20" (FIGS. 3a–3c)—but not the fore and aft mounting brackets 44', 45' associated with the spacer panels 29, 29', are provided with a latching mechanism which here takes the form of a latch pin 59, more commonly known as a "hitch pin", having a spring loaded retaining finger 60. Latch pin 59 is adapted to be manually protected by the vehicle driver through either of a selectable one of a pair of nylon bushings 61 which are press fit into respective ones of a pair of holes formed in the flanges 52 of the mounting brackets 44, 45, one of such holes being indicated at 62 in FIG. 8. Such holes 62 are respectively located vertically above and vertically below pivot pin 54, with one such hole 62 positioned to be aligned with the lowermost aperture 58 in the leading and trailing edges 30, 31 of the panels 28, 28', 28" when the rain skirt assembly 20', 20, 20" (FIG. 3a–3c) is in the operative depending position as shown in FIG. 6; and, the other of such holes 62 being positioned to h=aligned with the intermediate aperture 56 in the leading and trailing edges 30, 31 of the overall rain skirt assembly 20', 20, 20" when the latter is in the inoperative upstanding position as shown in FIG. 7.

More specifically, when the truck driver wishes to latch the rain skirt assembly 20', 20, 20" in a depending operative position such as shown in FIGS. 1 and 6, it is merely necessary to manually insert the latch pins 59 through the lowermost bushing 61 formed in respective ones of the fore and aft mounting brackets 44, 45—e.g., the lowermost bushing 61 as viewed in FIGS. 5 and 6—with the pins 59 thereafter passing through the aligned lowermost aperture 58 in respective ones of the leading and trailing edges 30, 31 of the rain skirt assembly 20', 20, 20" as best shown in FIG. 5 wherein the latch pin 59 is depicted as passing through the aperture 58 in the trailing edge 31 of panel 28'. Once inserted in the foregoing manner, the spring biased finger 60 serves to insure that the latch pin 59 remains in place until such time as affirmatively removed by the driver by pulling laterally on ring 64 mounted on the latch pin 59.

On the other hand, when the driver wishes to latch the rain skirt assembly 20', 20, 20" in the inoperative upstanding position shown, for example, in FIGS. 2 and 7, it is merely necessarily to withdraw the two (2) fore and aft latch pins 59 from the position shown in FIG. 5 by pulling laterally on the rings 64 associated with each latch pin 59, thus, depressing the spring biased fingers 60 as the latch pins are withdrawn through the lowermost aperture 58 in the leading and trailing edges 30, 31 of the rain skirt assemblies 20', 20, 20" and through the lowermost bushing 61 in mounting bracket flange 52 associated with each of the fore and aft mounting brackets 44, 45. The rain skirt assembly 20', 20, 20" is then manually pivoted outwardly and upwardly about the associated ones of the two (2) coaxially aligned pivot pins 54, and any elongate pivot pin(s) 54' employed in tandem axle configurations, to the vertically upstanding position shown in FIGS. 2 and 7, in which position the intermediate apertures 56 in the leading and trailing edges 30, 31 of the associated rain skirt assemblies 20', 20, 20" will be aligned with the uppermost bushing 61 mounted in the flange 52 associated with each of the fore and aft mounting brackets 44, 45. The driver then needs merely to reinsert the latch pins 59, this time through the aligned upper bushing 61 in each of the fore and aft mounting brackets 44, 45 and the intermediate apertures 56 in the leading and trailing edges 30, 31 of the rain skirt assembly 20', 20, 20" so as to latch the assembly in the uppermost inoperative position shown in FIGS. 2 and 7 wherein the driver has complete freedom of unobstructed access to the vehicle running gear.

In accordance with yet another of the important aspects of the present invention, provision is made for biasing those rain skirt assemblies 20, 20″ (FIGS. 3b and 3c) intended for use in tandem axle installations into their normally operative position as shown, for example, in FIGS. 1, 3b, 3c, 4, 6, and 9, it being understood that no such biasing means are required in connection with a single axle installation in view of the relatively short nature of the rain skirt assembly 20′ as shown in FIG. 3a. To this end, and as best illustrated by reference to FIGS. 5, 9, and 10 conjointly, a pair of coil springs 65, 66 are mounted about that portion of the elongate pivot pin 54′ which is (are) associated with the spacer panel 29, 29′—i.e., that portion of the pivot pin 54′ intermediate the leading and trailing edges 32, 34 of the spacer panel. The innermost ends 65′, 66′ of the two coil springs 65, 66, respectively, extend tangentially therefrom in generally side-by-side relation and are maintained in a fixed position by means of a rod 68 having its opposite ends fixedly mounted within respective ones of the leading and trailing edges 32, 34 of the spacer panel 29, 29′—that is, the spring ends 65′, 66″ extend outwardly of, and over, the rod 68. The opposite, or outboard, ends 65″, 66″ of the coil springs 65, 66, respectively, are looped inwardly and in fore and aft directions, respectively, so as to extend beyond the leading and trailing edges 32, 34 of the spacer panel 29, 29′, with such coil spring ends being threaded through, and hookedly engaged with, holes 69 formed in respective ones of the flanges 52′ on the fore and aft mounting brackets 44′, 45′, as best shown in FIGS. 5, 9, and 10.

Thus, the arrangement is such that the coil springs 65, 66 serve to bias the rain skirt assemblies 20, 20″ (FIGS. 3b and 3c) used with tandem axle installations into their normally operative position as shown in FIGS. 1, 3b, 3c, 4, 5, and 9; and, when the driver finds it necessary to pivot the tandem rain skirt assemblies 20, 20″ outwardly and upwardly into their inoperative upstanding position as shown in FIGS. 2 and 10, it is merely necessary to manually overcome the biasing force provided by the springs 65, 66 while pivoting the rain skirt assemblies until such time as the latter are capable of being latched into their uppermost inoperative position by latch pins 59 as shown in FIG. 7. Thus, when the fore and aft latch pins 59 are removed, the forces stored in coil springs 65, 66 serve to restore the tandem rain skirt assembly 20, 20″ to the depending operative position as shown in FIG. 9 and to retain the rain skirt assembly in that position.

In keeping with this aspect of the invention, one or more stops such, for example, as the adjustable stop indicated at 70 in FIGS. 9 and 10, may be mounted on the side frame 21 or other structural member of the vehicle and positioned so as to provide a fixed, non-yielding stop surface that can engage the inner surface of one or more of the panels 28, 28′, 28″ and/or the spacer panels 29, 29′ at one or more positions intermediate the leading and trailing edges 30, 31 of a rain skirt assembly 20, 20″ designed for use in tandem axle installations—here the exemplary stop 70 is shown in FIG. 9 in a position where it engages the inner surface of the upper section 41 of spacer panel 29. Where the fixed stop 70 constitutes a resilient bumper mounted on the projecting end of a threaded fastener in much the same fashion as a conventional doorstop of the type adapted to be mounted on a baseboard—i.e., a stop such as that shown in FIGS. 5, 9, and 10—the stop 70 performs a dual function. Thus, it provides a fixed protecting surface integral with the vehicle body against which the rain skirt assembly 20, 20″ is biased by coil springs 65, 66, thereby preventing flutter and chatter of relatively long rain skirt assemblies 20, 20″ which, as previously indicated, may be respectively on the order of 89″ and 137¼″ in length. Secondly, the adjustable stop 70 provides a means enabling the driver to align such relatively long rain skirt assemblies 20, 20″ so as to insure that they reside in a single plane parallel to the vehicle side wall or other axially extending frame member such as the side frame 21 shown in FIGS. 1, 2, 6, 7, 9, and 10.

In order to enhance collection of laterally projected, finely atomized, dense mist-like sprays and subsequent downward dispersal thereof towards the road surface, the inner surfaces of the panels 28, 28', 28'', and of the spacer panels 29, 29' where employed, are preferably lined with a material having a high affinity and capacity for liquid absorption such, for example, as an open cell expanded nylon sheet material of the type diagrammatically depicted at 71 in FIGS. 4, 5, 6, 9, and 10. For example, excellent results have been attained using such a material manufactured by the Minnesota Mining & Manufacturing Co. and marketed under the trademark "SCOTCH BRITE". Thus, it has been found that where sheets of such material are either adhesively bonded or otherwise affixed to the inner surfaces of at least portions of the panels—for example, the inner surfaces of the uppermost rectangular sections 38, 41 of the panels 28, 28', 28'' and spacer panels 29, 29', respectively—such material effectively captures and absorbs virtually 100% of the finely atomized, laterally projected mist, allowing the mist to be reconverted to liquid form with the collected water simply exiting the lower edges of sheets 71 and dropping downwardly to the road surface from the lower edges of the rain skirt assemblies 20', 20, 20'' (FIGS. 3*a*–3*c*) which are located outboard of the rapidly rotating vehicle tires.

Thus, those skilled in the art will appreciate that there have herein been disclosed simple, yet rugged and highly effective modular rain skirt assemblies which can readily be employed with virtually any type of heavy vehicle running gear and which can easily be installed on such vehicles. Because the rain skirt assemblies 20', 20, 20'' are disposed entirely outboard of the rotating tires and out of frictional engagement therewith, there is no tendency to generate and/or collect heat, nor is there any tendency to cause frictional wear of either tires or the components of the rain skirt assemblies. Only two different modules are required to fabricate an overall unitary rain skirt assembly suitable for use with single axle installations as well as with dual and triple tandem axle installations, irrespective of whether any given axle supports single or dual wheels. The rain skirt assemblies of the present invention may be used with all axles of trucks and tractor-trailer combinations, thus effectively eliminating finely atomized laterally projecting mists throughout the entire length of the vehicle which may be traveling at relatively high speeds over rain soaked highways, thereby eliminating the risk of blinding other vehicle drivers in adjacent traffic lanes during passing situations. Because of their streamlined contoured configuration, the rain skirt assemblies of the present invention do not project outwardly any significant distance from the vehicle so as to present a further traffic hazard; and, indeed, they actually enhance the appearance of vehicles to which they are attached. The rain skirt assemblies of the invention may be quickly and easily pivoted manually to inoperative upright positions, thereby providing complete unobstructed access to the vehicle running gear for purposes of changing tires, installing and/or removing chains, and other routine maintenance without having to dismantle the assembly.

Moreover, the rain skirt assemblies of the present invention readily permit the installation of reflectors such as those shown by way of example at 72 in FIG. 1; or, alternatively, installation of running lights and/or track lights (not shown), all of which serve to further enhance the safety characteristics of the vehicle.

Finally, the nature of the rain skirt assemblies 20', 20, 20" (FIGS. 3a-3c) is such that they present attractive locations for the application of logos and/or other types of corporate identifying information which can be readily applied to the outer surfaces of one or more of the panels 28, 28', 28", 29, 29' by means of decals, silk-screening techniques, and the like, or which can be raised and/or recessed in the ABS or other plastic material during the forming operation. Indeed, such corporate identifications can, if desired, be backlighted with the use of conventional sealed lighting fixtures.

What I claim as my invention is:

1. A modular rain skirt assembly for use in reducing the laterally projected component of finely atomized, dense, mist emanating from the running gear of heavy vehicles traveling on rain coated road surfaces, said rain skirt assembly comprising, in combination:

(a) generally flat, elongated, panel defining means having inturned leading and trailing edges and defining a projected mist capture area adapted to extend downwardly about the outer upper surfaces of the vehicle's running gear and in parallel laterally spaced relation thereto wherein mounted on a vehicle; and, (b) first fore and aft mounting bracket means adapted to be affixed to the side of the vehicle immediately above and both fore and aft of the vehicle's running gear, each of said first fore and aft mounting bracket means including: (i) means for fixedly securing said first mounting bracket means on a vehicle body; (ii) a first pivot pin extending in a fore and aft direction and projecting from said first mounting bracket means along a longitudinal line parallel to the plane of said elongate panel defining means and positioned to pass through respective ones of said inturned leading and trailing edges on said rain skirt assembly for pivotally mounting said panel defining means on said first mounting bracket means in a position overlying the outer, upper surfaces of the vehicle's running gear; and (iii), latch means adapted to latchingly couple said elongated panel defining means to said first mounting bracket means in a selected one of a first operative position wherein said panel defining means projects downwardly parallel to the vehicle body in operative mist collecting relation about the outer, upper surfaces of the vehicle's running gear, and a second inoperative position wherein said panel defining means is pivoted upwardly into a position generally parallel to the vehicle body so as to permit unobstructed access to the vehicle's running gear.

2. A modular rain skirt assembly as set forth in claim 1 wherein said panel defining means comprises a single panel suitable for mounting on a vehicle in operative mist collecting association with vehicle running gear having a single axle.

3. A modular rain skirt assembly as set forth in claim 1 wherein said panel defining means includes a plurality of identical, generally flat, elongate panels each having inturned leading and trailing edges suitable for mounting on a vehicle in operative mist collecting association with vehicle running gear having tandem axles, said modular rain skirt assembly further including spacer panel defining means positioned intermediate each pair of adjacent ones of said elongate panels, said spacer panel defining means having inturned leading and trailing edges complementally shaped with respect to respective ones of said inturned trailing and leading edges on said elongate panel defining means, and means for fastening said trailing edge of one of said elongate panels and said leading edge of another of said elongate panels to respective different ones of said leading and trailing edges of said spacer panel defining means so as to form a unitary rain skirt assembly including one elongate panel positioned o be mounted outboard of, and in operative emit collecting association with, a tandem axle running gear configuration.

4. A modular rain skirt assembly as set forth in claim 3 wherein two such elongate panels are separated by a single spacer panel for use with a dual tandem axle configuration.

5. A modular rain skirt assembly as set forth in claim 3 wherein three such elongate panels are separated by two spacer panels for use with a triple tandem axle configuration.

6. A modular rain skirt assembly as set forth in claims 3, 4, or 5 wherein said first fore and aft mounting bracket means are pivotally connected to respective different ones of the inturned leading edge of the forwardmost one of said longate panels and the inturned trailing edge of the rearmost one of said elongate panels; and, further including second fore and aft mounting bracket means adapted to be affixed to the side of the vehicle adjacent said inturned leading and trailing edges on each of said spacer panel defining means, each of said second fore and aft mounting bracket means including; (i) means for fixedly securing said second fore and aft mounting bracket means on a vehicle body; and (ii), means defining an elongate second pivot pin extending in a fore and aft direction and projecting through and beyond said leading and trailing edges of said spacer panel defining means with respective ones of the projecting fore and aft ends of said elongate pivot pin passing through, and being pivotally coupled to, respective ones of said second fore and aft mounting bracket means, said elongate second pivot pin being coaxial with said first pivot pins on each of said first fore and aft mounting bracket means.

7. A modular rain skirt assembly as set forth in claims 3, 4, or 5, wherein biasing means are mounted on at least one of said elongate panels and said spacer panel defining means for normally biasing said unitary rain skirt assembly into a vertically depending operative position for impeding lateral projection of finely atomized mist from the vehicle running gear.

8. A modular rain skirt assembly as set forth in claim 6, wherein biasing means are mounted on at least one of said elongate panels and said spacer panel defining means for normally biasing said unitary rain skirt assembly into a vertically depending operative position for impeding lateral projection of finely atomized mist from the vehicle running gear.

9. A modular rain skirt assembly as set forth in claim 7 wherein said biasing means comprises at least one coil spring mounted concentrically about said elongate second pivot pin and having one free end of said spring coupled to said spacer panel defining means and its opposite free end coupled to one of said second fore and aft mounting bracket means.

10. A modular rain skirt assembly as set forth in claim 8 wherein said biasing means comprises at least one coil spring mounted concentrically about said elongate second pivot pin and having one free end of said spring coupled to said spacer panel defining means and its opposite free end coupled to one of said second fore and aft mounting bracket means.

11. A modular rain skirt assembly as set forth in claim 9 further including means defining at least one rigid stop adapted to be affixed to, and project laterally from, the vehicle for engagement with the inner surface on at least one of said the lateral plane of said unitary rain skirt assembly with respect to the side of the vehicle on which it is mounted.

12. A modular rain skrit assembly as set forth in claim 10 further including means defining at least one rigid stop adapted to be affixed to, and project laterally from, the vehicle for engagement with the inner surface on at least one of said elongate panels and said spacer panel defining means for fixing the lateral plane of said unitary rain skirt assembly with respect to the side of the vehicle on which it is mounted.

13. A modular rain skirt assembly as set forth in claim 11 wherein said means defining at least one rigid stop is laterally extensible and retractable for adjusting the lateral position of said unitary rain skirt assembly with respect to the vehicle and thereby permitting co-planar axial alignment of all of said elongated panels and said spacer panel defining means.

14. A modular rain skirt assembly as set forth in claim 12 wherein said means defining at least one rigid stop is laterally extensible and retractable for adjusting the lateral position of said unitary rain skirt assembly with respect to the vehicle and thereby permitting co-planar axial alignment of all of said elongate panels and said spacer panel defining means.

15. A rain skirt assembly as set forth in claims 1, 2, 3, 4 or 5 wherein said latch means includes a removable latch pin adapted to pass through: (i) a first set of aligned openings formed in respective ones of said first fore and aft bracket means and in the associated leading and trailing edges of said rain skirt assembly when said assembly is disposed in a vertically depending operative position; and (ii), a second set of aligned openings formed in respective ones of said first fore and aft mounting bracket means and in the associated leading and trailing edges of said rain skirt assembly when said assembly is pivoted upwardly into a vertically upstanding inoperative position.

16. A rain skirt assembly as set forth in claim 15 wherein said latch pin includes a spring loaded finger for retaining said latch pin removably captive within said aligned openings, and means for grasping said latch pin to permit manual withdrawal thereof from said aligned openings.

17. A rain skirt assembly as set forth in claims 1 or 2 wherein said elongate panel defining means includes a sheet of liquid absorbant material affixed to at least a portion of the inner surface thereof for collecting laterally projected mist and permitting the collected liquid to pass downwardly over the inner surface of said rain skirt assembly and drop back to the road surface outboard of the vehicle running gear.

18. A rain skirt assembly as set forth in claims 3, 4 or 5, wherein each of said elongate panels and each of said spacer panel defining means includes a sheet of liquid absorbant material affixed to at least a portion of the inner surface thereof for collecting laterally projecting mist and permitting the collected liquid to pass downwardly over the inner surfaces of said unitary rain skirt assembly and drop back to the road surface outboard of the vehicle's running gear.

19. A rain skirt assembly as set forth in claim 17 wherein said sheet of liquid absorbant material comprises a sheet of open cell expanded nylon sheet material.

20. A modular rain skirt assembly as set forth in claim 14 wherein said sheet of liquid absorbant material comprises a sheet of open cell expanded nylon material.

21. A modular rain skirt assembly for use in reducing the laterally projected component of finely atomized, dense, mist emanating from the tandem axle running gear of heavy vehicles traveling on rain coated road surfaces, said rain skirt assembly comprising, in combination:
(a) a plurality of generally flat, elongate panels, each having inturned leading and trailing edges and each defining a projected mist capture area adapted to extend downwardly about the outer upper surface of tires mounted on a given axle in the vehicle's tandem axle running gear and in parallel laterally spaced relation thereto wherein mounted on a vehicle;
(b) spacer panel defining means positioned intermediate each pair of adjacent ones of said elongated panels, said spacer panel defining means having inturned leading and trailing edges complementally shaped with respect to respective ones of said inturned trailing and leading edges on said elongate panels;
(c) means for fastening said trailing edge of one of said elongate panels and said leading edge of another of said elongate panels to respective different ones of said leading and trailing edge of said spacer panel defining means so as to form a unitary rain skirt assembly including one elongate panel positioned to be mounted outboard of, and in operative mist collecting association with, those wheels mounted on each different axle included in a tandem axle running gear configuration;
(d) first fore and aft mounting bracket means adapted to be affixed to the side of the vehicle immediately above, and both fore and aft of, the vehicle's tandem axle running gear, each of said first fore and aft mounting bracket means including: (i) means for fixedly securing said first mounting bracket means on a vehicle body; (ii) a first pivot pin extending in a fore and aft direction and projecting from said first mounting bracket means along a longitudinal line parallel to the plane of each of said elongate panels and said spacer panel defining means, and positioned to pass through respective ones of said inturned leading and trailing edges on the forwardmost and rearmost ones, respectively, of said elongate panels for pivotally mounting said unitary rain skirt assembly on said first mounting bracket means along a longitudinal line parallel to the plane of each of said elongate panels and said spacer panel defining means, and positioned to pass through respective ones of said inturned leading and trailing edges on the forwardmost and rearmost ones, respectively, of said elongate panels for pivotally mounting said unitary rain skirt assembly on said first mounting bracket means in a position overlying the outer, upper surfaces to the vehicle's tandem axle running gear; and (iii), latch means adapted to latchingly couple said unitary rain skirt assembly to said first mounting bracket means in a selected one of a first operative positioned herein said unitary rain skirt assembly projects downwardly parallel to the vehicle body in operative mist collecting relation about the outer, upper surfaces of the vehicle's tandem axle running gear, and a second inoperative position wherein said unitary rain skirt assembly is pivoted upwardly into a position generally parallel to vehicle body so as to permit unobstructed access to the vehicle's tandem axle running gear; and, (e) second fore and aft mounting bracket means adapted to be affixed to the side of the vehicle adjacent said inturned leading and trailing edges on each of said spacer panel defining means, each of said second fore and aft mounting bracket means including: (i) means for fixedly securing said second fore and after mounting bracket means on a vehicle body; and (ii) means defining an elongate second pivot pin coaxialy with said first pivot pins on each of said first fore and after mounting bracket means, said elongate second pivot pin projecting through and beyond said leading and trailing edges of said spacer panel defining means with respective ones of the projecting fore and after ends of said elongate second pivot pin passing through, and being pivotally coupled to, respective ones of said second fore and after mounting bracket means.

22. A modular rain skirt assembly as set forth in claim 21 wherein biasing means are mounted on at least one of said plurality of generally flat, elongate panels and said spacer panel defining means for normally biasing said unitary rain skirt assembly into a vertically depending operative position for impeding lateral projection of finely atomized mist from the vehicle's tandem axle running gear.

23. A modular rain skirt assembly as set forth in claim 22 wherein said biasing means comprises at least one coil spring mounted concentrically about said elongate second pivot pin and having one free end of said spring coupled to said spacer panel defining means and its opposite free end coupled to one of said second fore and aft mounting bracket means.

24. A modular rain skirt assembly as set forth in claim 22 wherein said biasing means comprises a pair of coil springs mounted in side-by-side adjacent relation concentrically about said elongate second pivot pin, the innermost adjacent ends of said pair of coil springs extending tangentially therefrom and defining free ends coupled to said spacer panel defining means, the opposite free end of the forwardmost one of said coil springs being looped rearwardly about, and projecting forwardly beyond, the leading edge of said spacer panel defining means and being coupled to said second fore mounting bracket means, and the opposite free end of the rearmost one of said coil springs being looped rearwardly about, and projecting rearwardly beyond, the trailing edge of said spacer panel defining means and coupled to said second aft mounting bracket means.

25. A modular rain skirt assembly as set forth in claims 21, 22, 23 or 24, further including means defining at least one rigid stop adapted to be affixed to, and project laterally from the vehicle for engagement with the inner surface on at least one of said elongate panels and said spacer panel defining means for fixing the lateral plane of said unitary rain skirt assembly with respect to the side of the vehicle on which it is mounted.

26. A modular rain skirt assembly as set forth in claim 25 wherein said means defining at least one rigid stop is laterally extensible and retractable for adjusting the lateral position of said unitary rain skirt assembly with respect to the vehicle and thereby permitting coplanar axial alignment of all of said elongate panels and said spacer panel defining means.

27. A rain skirt assembly as set forth in claim 21 wherein said latch means on said first fore and aft mounting bracket means includes a removable latch pin adapted to pass through: (i) a first set of aligned openings formed in respective ones of said first fore and aft mounting bracket means and in the associated leading and trailing edges of said unitary rain skirt assembly when said assembly is disposed in a vertically depending operative position; and (ii), a second set of aligned openings formed in respective ones of said first fore and aft mounting bracket means and in the associated leading and trailing edges of said unitary rain skirt assembly when said assembly is pivoted upwardly into a vertically upstanding inoperative position.

28. A rain skirt assembly as set forth in claim 27 wherein said latch pin includes a spring loaded finger for retaining said latch pin removably captive within said aligned openings, and means for grasping said latch pin to permit manual withdrawal thereof from said aligned openings.

29. A rain skirt assembly as set forth in claim 21 wherein each of said elongate panels and said spacer panel defining means include a sheet of liquid absorbant material affixed to at least a portion of the inner surface thereof for collecting laterally projected mist and permitting the collected liquid to pass downwardly over the inner surface of said unitary rain skirt assembly and drop back to the road surface outboard of the vehicle running gear.

30. A rain skirt assembly as set forth in claim 29 wherein said sheet of liquid absorbant material comprises a sheet of open cell expanded nylon sheet material.

* * * * *